(12) United States Patent
Nakamura (10) Patent No.: US 6,671,093 B2
(45) Date of Patent: Dec. 30, 2003

(54) SCREEN FOR REAR PROJECTION TYPE PROJECTOR

(75) Inventor: Tomoyuki Nakamura, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/879,873

(22) Filed: Jun. 11, 2001

(65) Prior Publication Data

US 2002/0012166 A1 Jan. 31, 2002

(30) Foreign Application Priority Data

Jun. 26, 2000 (JP) ........................................ 2000-191396

(51) Int. Cl.⁷ ............................ G03B 21/60; G03B 27/10
(52) U.S. Cl. ........................................ 359/456; 359/621
(58) Field of Search .............................. 359/455, 456, 359/457, 1, 15, 619, 621, 449

(56) References Cited

U.S. PATENT DOCUMENTS

| | | | | |
|---|---|---|---|---|
| 5,121,252 A | * | 6/1992 | Okada et al. ............... | 359/455 |
| 5,186,780 A | * | 2/1993 | Sakunaga et al. ........... | 359/456 |
| 5,206,761 A | * | 4/1993 | Ogino ........................ | 359/457 |
| 5,870,225 A | * | 2/1999 | Ogino et al. ................ | 359/457 |
| 6,130,777 A | * | 10/2000 | Yamashita et al. .......... | 359/456 |
| 6,278,546 B1 | * | 8/2001 | Dubin et al. ................ | 359/456 |
| 6,400,504 B2 | * | 6/2002 | Miyata ....................... | 359/457 |
| 6,437,914 B1 | * | 8/2002 | Hall et al. ................... | 359/457 |

FOREIGN PATENT DOCUMENTS

JP  6-273852  9/1994

* cited by examiner

*Primary Examiner*—Christopher Mahoney
(74) *Attorney, Agent, or Firm*—Frishauf, Holtz, Goodman & Chick, P.C.

(57) ABSTRACT

A screen for a rear projection type projector includes a main screen formed by bonding a plurality of lenticular lens sheets into one with the edges thereof as a junction plane, and a transmissive diffusion screen for rear use including an image forming layer and a transparent layer arranged behind the main screen on an optical path of light fluxes projected from a projector, wherein the junction plane is located at a position near the center of a main surface of the main screen.

6 Claims, 9 Drawing Sheets

FIG.16

SCREEN FOR REAR PROJECTION TYPE PROJECTOR

This application claims benefit of Japanese Application No. 2000-191396 filed in Japan on Jun. 26, 2000, the contents of which are incorporated by this reference.

BACKGROUND OF THE INVENTION

1. Field of the Invention

The present invention relates to a screen for a rear projection type projector, and more particularly, to a screen for a rear projection type projector, which displays an image by receiving luminous fluxes projected from a projector on the rear side and is capable of observing the displayed image from the front side.

2. Description of the Related Art

Various proposals have conventionally been made about a screen which displays an image by receiving luminous fluxes projected from a projector on the rear side and is capable of observing the displayed image from the front side. For example, Japanese Laid-open patent publication No. 6-273852 discloses a transmissive cabinet screen in which a lenticular lens sheet forming a lens surface is arranged on the incident side, and a box-shaped front light diffusing cabinet having a diffusing material on the surface thereof or in the interior thereof is arranged on the emitting side.

The lenticular lens sheet can be formed by any of various means. In an example, a long strip-shaped sheet is formed by extruding a transparent resin material while rotationally pressing the same by means of a roller having grooves cut in the lenticular direction. Then, for example, a rectangular sheet is formed by cutting the long sheet into a size necessary for use as a screen. For the strip-shaped sheet formed by use of such a roller, while the length is limited to a predetermined value in the width direction, an arbitrary length can be adopted in the strip longitudinal direction.

The width of a lenticular lens sheet is regulated by the manufacturing process as described above. In order to obtain a large-sized screen of over a predetermined width, therefore, the manufacturing line must be rebuilt using a wider roller, resulting in a large increase in manufacturing cost.

This is not limited to a case where a screen for a rear projection type projector is formed with lenticular lens sheets, but poses a problem generally applicable to cases where the size of screen sheet members serving as a component material is regulated.

SUMMARY OF THE INVENTION

Accordingly it is an object of the present invention to provide a screen for a rear projection type projector, which is manufacturable at a low cost and has a large display area.

Briefly, the present invention provides a screen for a rear projection type projector comprising a main screen formed by bonding a plurality of screen sheet members with edges thereof as junction planes into one, and a transmissive diffusion screen arranged behind the main screen on the optical path of luminous fluxes projected from the projector.

The above and other objects, features and advantages of the invention will become more apparent from the following description when taken in conjunction with the accompanying drawings.

DESCRIPTION OF THE PREFERRED EMBODIMENTS

Embodiments of the present invention will now be described with reference to the drawings.

Figure 1:
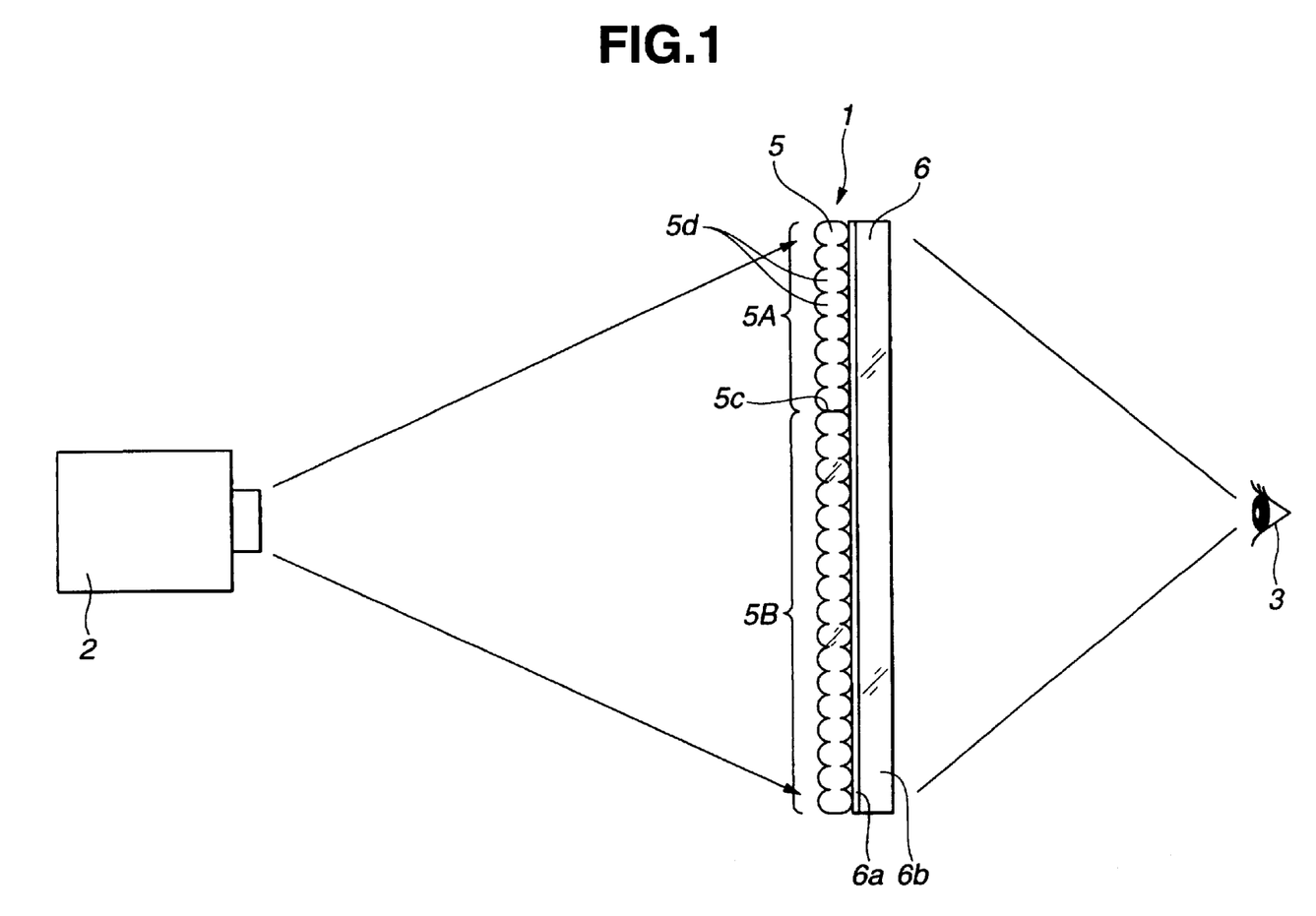
FIG. 1 is a plan view illustrating an observer who observes an image projected from a projector onto a screen for a rear projection type projector of an embodiment of the present invention.
Figure 2A:
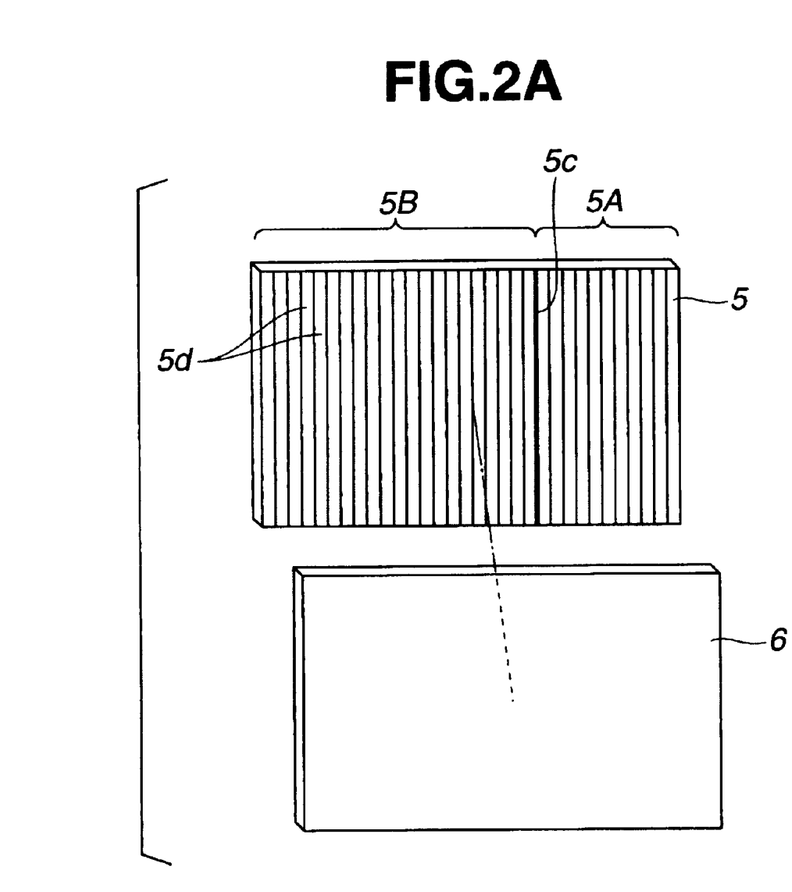
FIGS. 2A and 2B are perspective views illustrating the configuration of the screen for a rear projection type projector of the embodiment shown in FIG. 1.
Figure 2B:
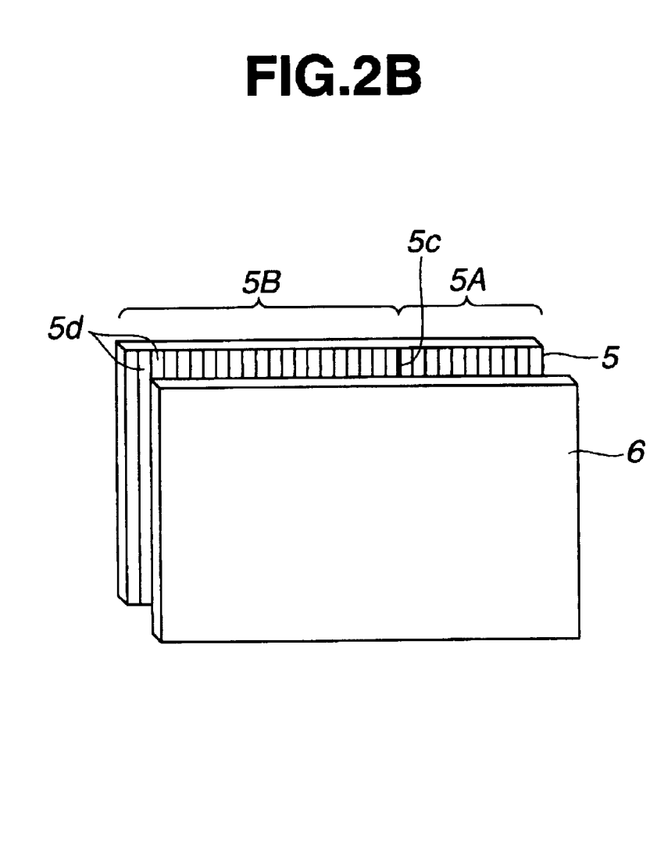
Figure 3A:
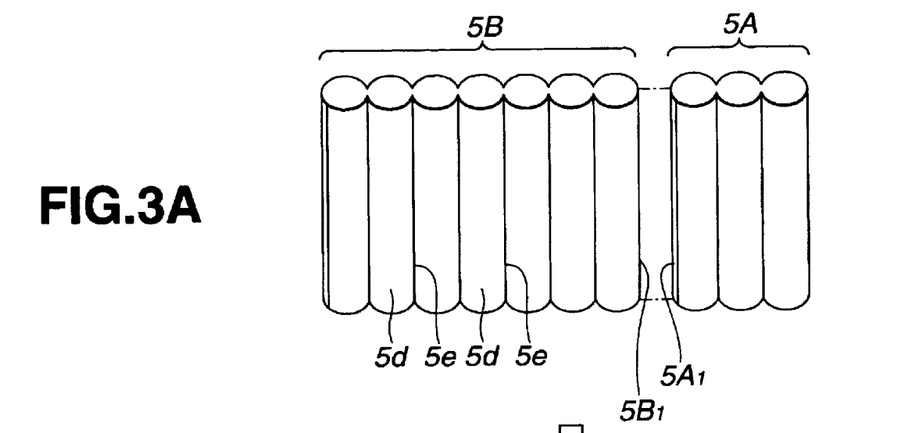
FIGS. 3A and 3B illustrate construction of a main screen by bonding two lenticular lens sheets in the embodiment shown in FIG. 1.
Figure 3B:
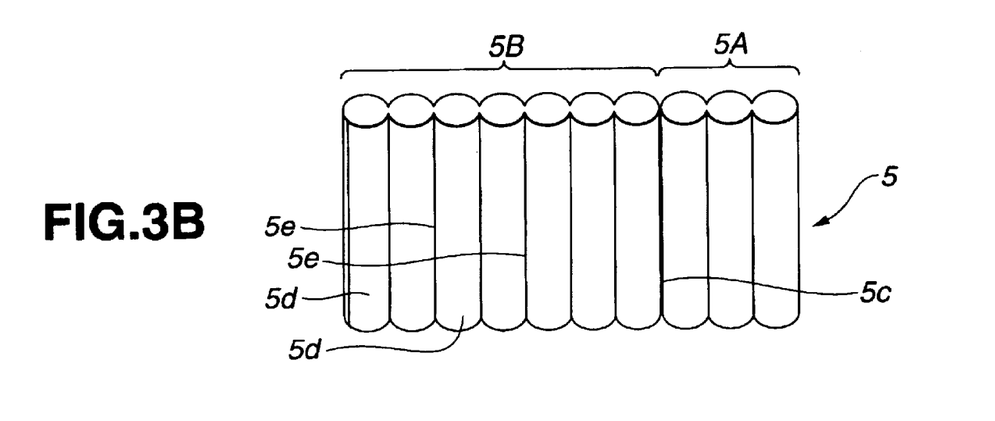
Figure 5:
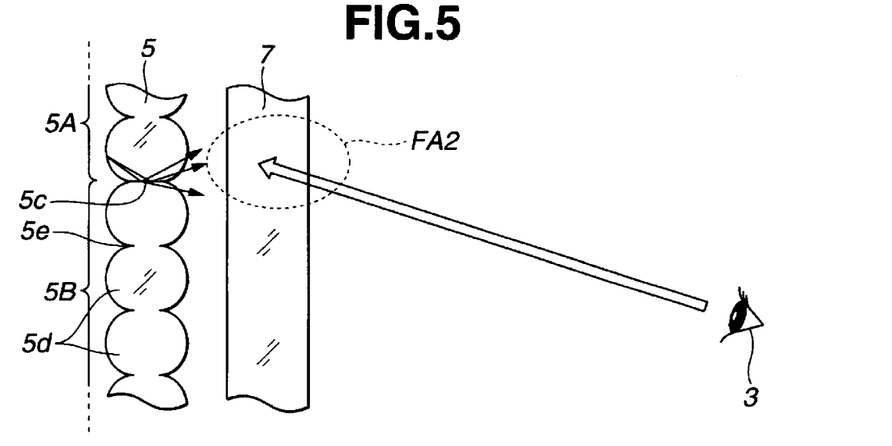
FIG. 5 illustrates observation of luminous fluxes passing through the junction plane of the main screen when using a kneaded type transmissive diffusion screen as a transmissive diffusion screen in the embodiment shown in FIG. 1.
Figure 6:
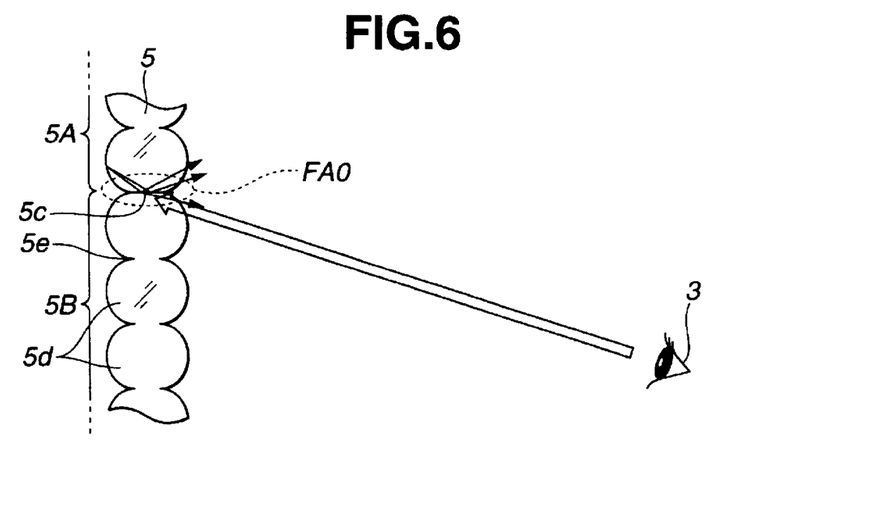
FIG. 6 illustrates observation of luminous fluxes passing through the junction plane of the main screen when using no transmissive diffusion screen in the embodiment shown in FIG. 1.
Figure 7:
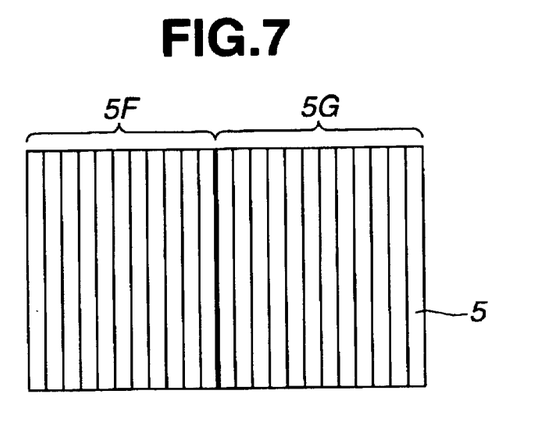
FIG. 7 is a front view illustrating an example of the main screen bonded at the center portion in the embodiment shown in FIG. 1.
Figure 8:
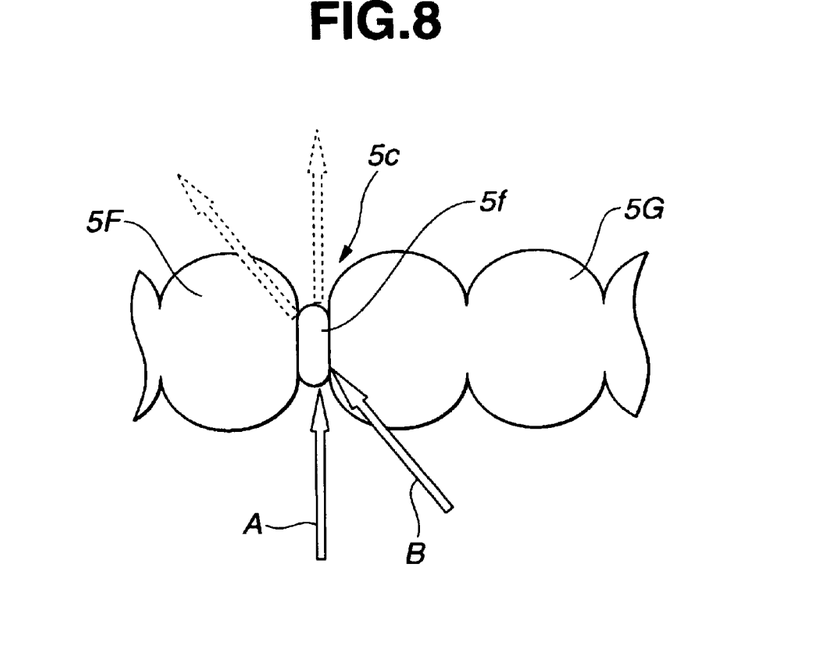
FIG. 8 illustrates the direction of the incident light entering the junction plane and the effect of the incident light direction as viewed from a side.
Figure 9:
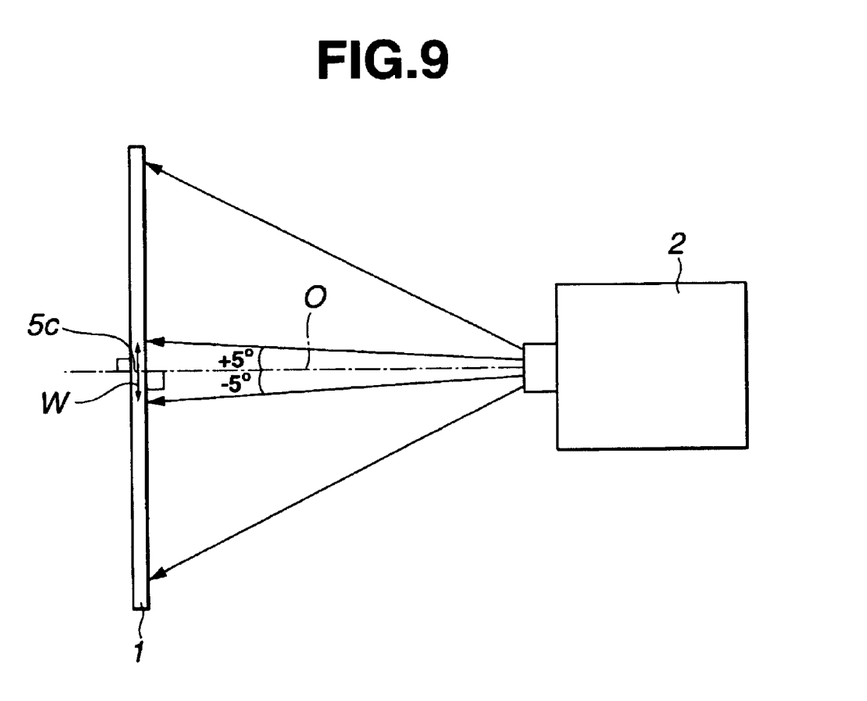
FIG. 9 illustrates a preferred arrangement of the junction plane on the screen.
Figure 10:
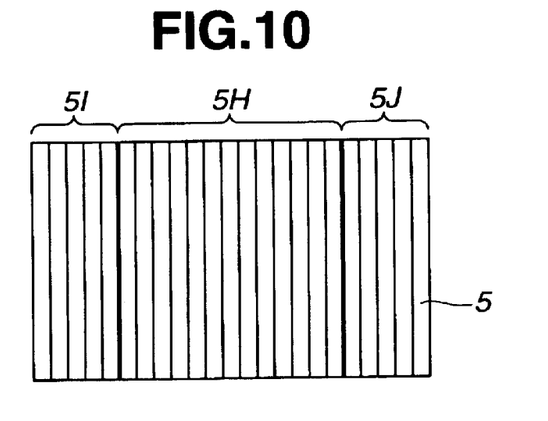
FIG. 10 is a front view illustrating an example of the main screen bonded at two positions to the right and to the left with the center portion in between in the embodiment shown in FIG. 1.
Figure 11:
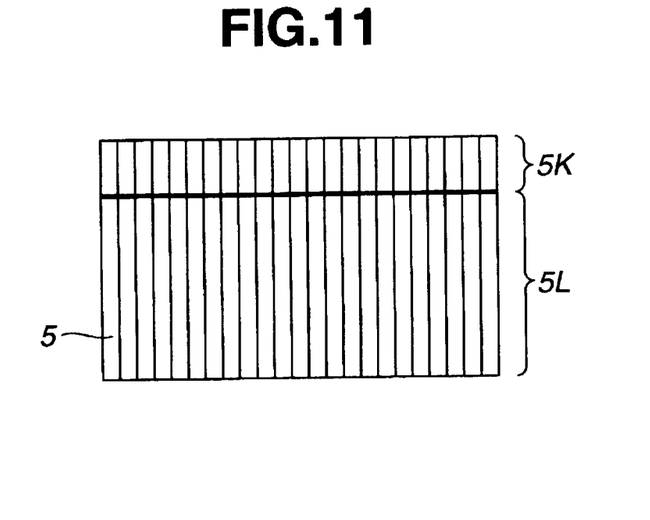
FIG. 11 is a front view illustrating an example of the main screen bonded at a junction plane perpendicular to the lenticular direction in the embodiment shown in FIG. 1.
Figure 12:
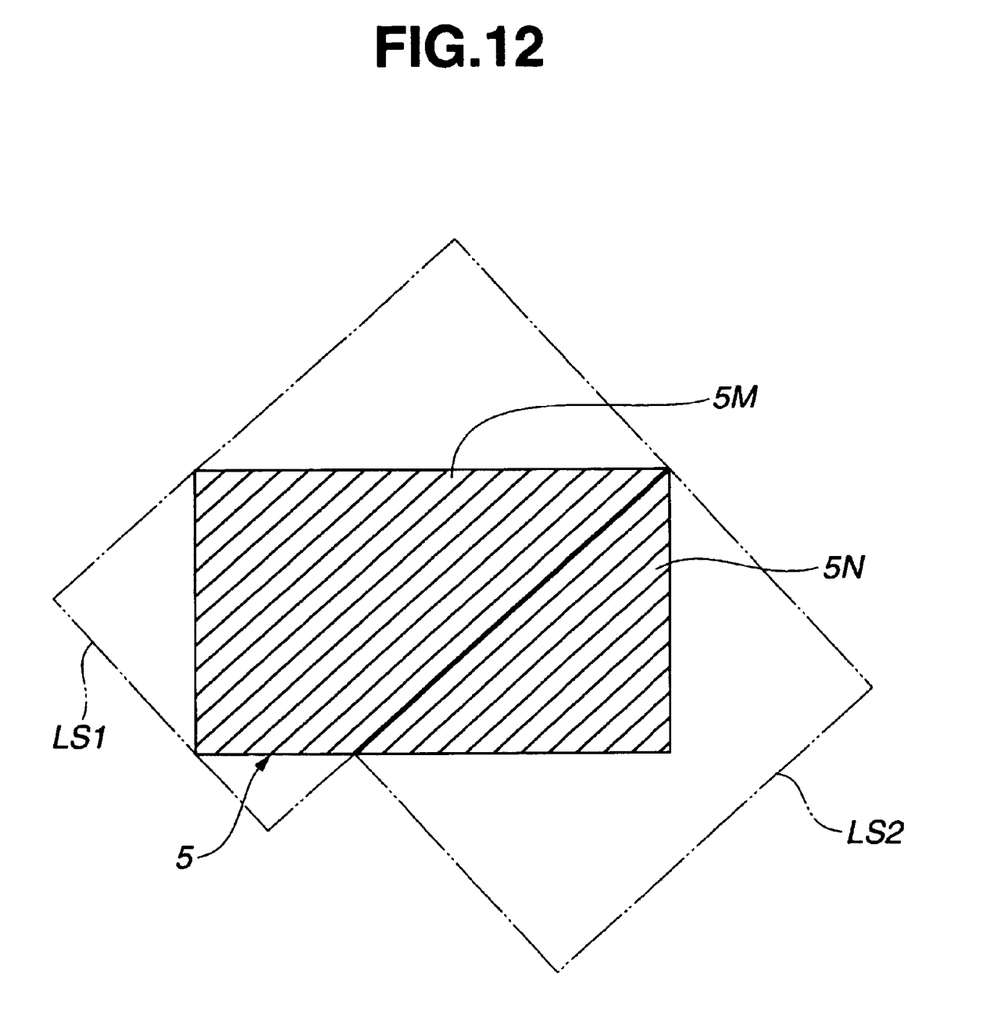
FIG. 12 is a front view illustrating an example of the main screen bonded by cutting so as to achieve a diagonal lenticular direction in the embodiment shown in FIG. 1.
Figure 13:
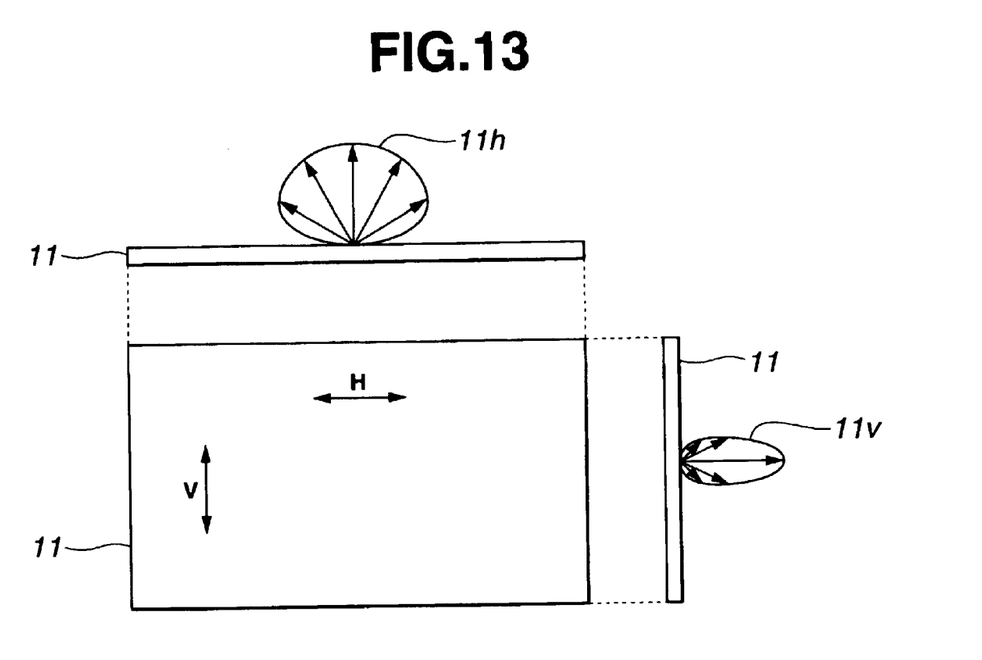
FIG. 13 is a trihedral diagram illustrating a holographic screen with degrees of diffusion different between the vertical and horizontal directions in the embodiment shown in FIG. 1.
Figure 14:
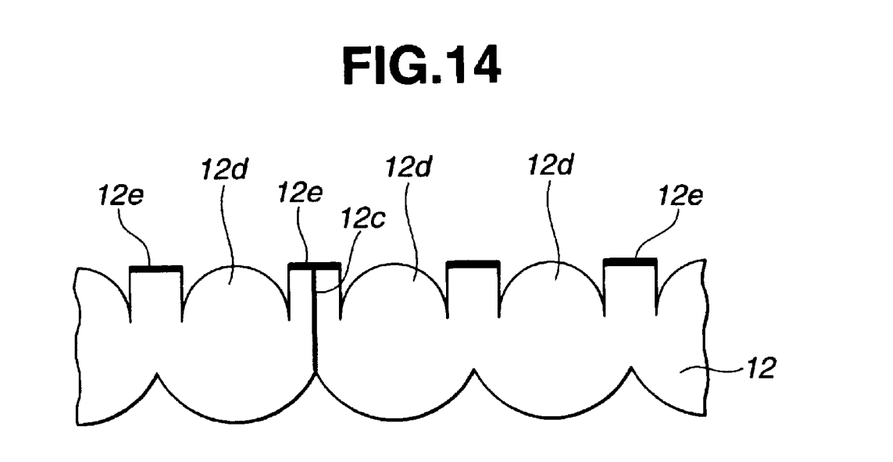
FIG. 14 illustrates a preferred position of the junction plane in a lenticular lens sheet having black stripes in the embodiment shown in FIG. 1.
Figure 15:
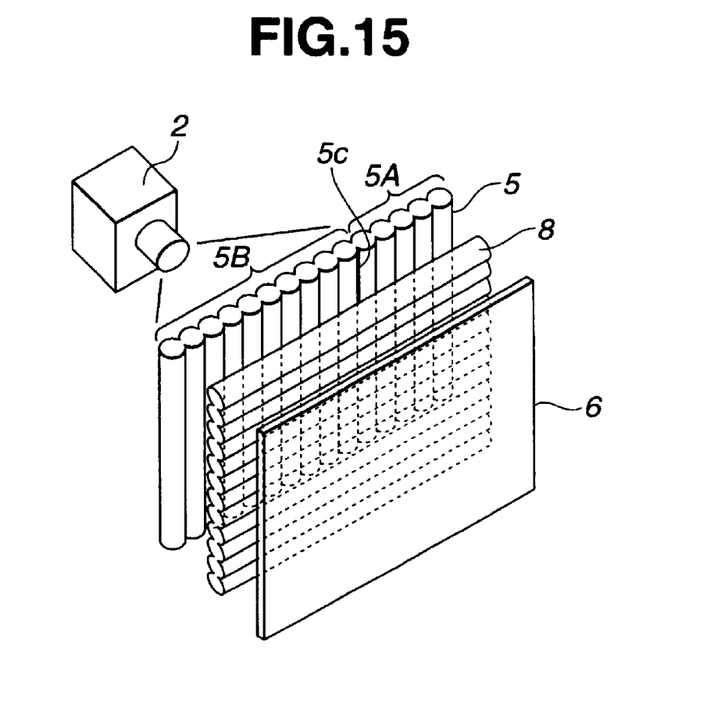
FIG. 15 is a perspective view illustrating an example of an arrangement when piling two lenticular lens sheets and a transmissive diffusion screen in the embodiment shown in FIG. 1.
Figure 16:
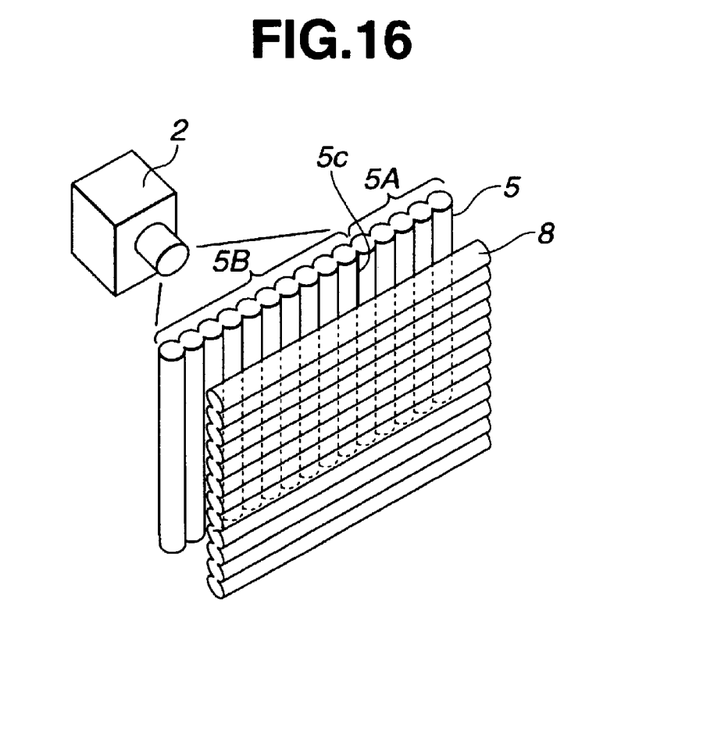
FIG. 16 is a perspective view illustrating an example in which a latter-stage lenticular lens sheet simultaneously serves as a transmissive diffusion screen in the configuration shown in FIG. 15.

FIGS. 1 to 16 illustrate an embodiment of the invention: FIG. 1 is a plan view illustrating an observer who observes an image projected from a projector onto a screen for a rear projection type projector; FIGS. 2A and 2B are perspective views illustrating the configuration of the screen for a rear projection type projector; FIGS. 3A and 3B illustrate construction of a main screen by bonding two lenticular lens sheets; FIG. 9: illustrates observation of luminous fluxes passing through the junction plane of the main screen when using a rear transmissive diffusion screen as a transmissive diffusion screen; FIG. 5 illustrates observation of luminous fluxes passing through the junction plane of the main screen when using a kneaded type transmissive diffusion screen as a transmissive diffusion screen; FIG. 6 illustrates observation of luminous fluxes passing through the junction plane of the the main screen when using no transmissive diffusion screen; FIG. 7 is a front view illustrating an example of the main screen bonded at the center portion; FIG. 8 illustrates the direction of the incident light entering the junction plane and the effect thereof as viewed from a side; FIG. 9 illustrates a preferred arrangement of the junction plane on the screen; FIG. 10 is a front view illustrating an example of the main screen bonded at two positions to the right and to the left with the center portion in between; FIG. 11 is a front view illustrating an example of the main screen bonded at a junction plane perpendicular to the lenticular direction; FIG. 12 is a front view illustrating an example of the main screen bonded by cutting so as to achieve a diagonal lenticular direction; FIG. 13 is a trihedral diagram illustrating a holographic screen with degrees of diffusion different between the vertical and horizontal directions; FIG. 14 illustrates a preferred position of the junction plane in a lenticular lens sheet having black stripes; FIG. 15 is a perspective view illustrating an example of an arrangement when piling two lenticular lens sheets and a transmissive diffusion screen; and FIG. 16 is a perspective view illustrating an example in which a latter-stage lenticular lens sheet simultaneously serves as a transmissive diffusion screen in the configuration shown in FIG. 15.

This screen for a rear projection type projector comprises, as shown in FIGS. 1, 2A and 2B, a main screen 5 made of lenticular lens sheets; and a transmissive diffusion screen 6 which is arranged behind the main screen 5 on the optical path of luminous fluxes as projected from a projector 2 and plays a role of diffusing luminous fluxes having passed through the main screen 5 to expand the viewing angle. The screen for a rear projection type projector projects an image from back which is the main screen 5 side so as to allow an observer 3 to observe the image from front which is the transmissive diffusion screen 6 side.

The aforementioned main screen 5 is formed by integrally bonding lenticular lens sheet 5B which is a wide screen sheet member, and a lenticular lens sheet 5A which is a relatively narrow screen sheet member, with the edges thereof forming a junction plane 5c.

In this configuration, the lenticular lens sheet 5B is formed by retaining the maximum width available from the manufacturing line, and the lenticular lens sheet 5A is formed by appropriately cutting the balance of the necessary width from the sheet available from the manufacturing line. As a result, the junction plane 5c is located at a position off the center portion of the main surface.

The above-mentioned lenticular lens sheets form a single sheet in which a plurality of long and slender substantially cylindrical or substantially semi-cylindrical lenses 5d are arranged in a direction perpendicular to the lenticular direction as shown in FIGS. 3A and 3B. Spaces between the lenses 5d form concave troughs 5e. By arranging the junction plane 5c bonding the sheets so as to be positioned at a trough 5e, the optical effect of the junction plane 5c becomes the slightest.

More specifically, the junction plane 5c is formed, as shown in FIG. 3B, by bonding an end face 5B1 corresponding to the trough 5e of the lenticular lens sheet 5B and an end face 5A1 corresponding to the trough 5e of the lenticular lens sheet 5A as shown in FIG. 3A by means of an adhesive or the like.

Operation of the aforementioned transmissive diffusion screen 6 will now be described with reference to FIG. 4.

When not using the transmissive diffusion screen 6, the focal point of the observer 3 agrees with a point near the main screen (for example, a portion represented by a reference numeral FAO) as shown in FIG. 6. Lines caused by the junction plane 5c may therefore be observed. FIG. 4 illustrates in contrast a case where the transmissive diffusion screen 6 formed as, for example, a transmissive diffusion screen for rear use is arranged. This transmissive diffusion screen is formed by coating a diffusion agent or a tinting agent (pigment) on a transparent layer 6b comprising an acrylic plate or the like, thereby forming a thin image forming layer 6a in the luminous flux passing direction. The image forming layer 6a is arranged so as to face the main screen 5.

Figure 4:
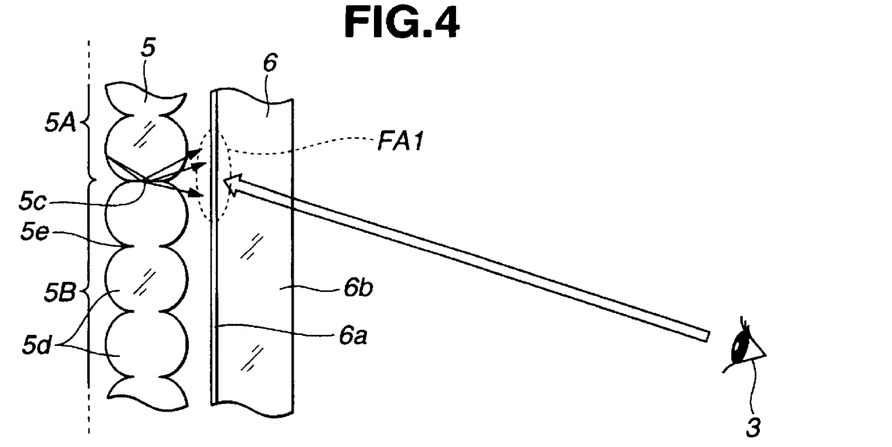
FIG. 4 illustrates observation of luminous fluxes passing through the junction plane of the main screen when using a rear transmissive diffusion screen as a transmissive diffusion screen in the embodiment shown in FIG. 1.

By using such a transmissive diffusion screen 6 for rear use, luminous fluxes refracted or reflected by the junction plane 5c are diffused over a range shown by a reference numeral FA1 in FIG. 4. Therefore, almost no line caused by the junction plane 5c is observed by the observer 3 whose eye focal point agrees with the image near the image forming layer 6a.

For example, a kneaded type transmissive diffusion screen 7 as shown in FIG. 5 may be used in place of the transmissive diffusion screen 6 shown in FIG. 4. This transmissive diffusion screen 7 is formed by kneading a diffusion agent or a tinting agent into the substrate material.

By using such a kneaded type transmissive diffusion screen 7, fluxes refracted or reflected by the junction plane 5c are diffused over a range shown by a reference numeral FA2 in FIG. 5. Therefore, almost no line caused by the junction plane 5c is observed by the observer 3 whose eye focal point agrees with the image near the transmissive diffusion screen 7.

As described above, bonding of the screen sheet members is accomplished by using, for example, an adhesive. An adhesive which has the same refractive index as that of the lenticular lens sheets is used as far as possible. However, it is still difficult to obtain completely uniform optical properties after bonding. In some cases, even an air layer may be mixed in. Such optical non-uniformity causes production of light reflection or refraction by the junction plane 5c as shown in FIG. 4 and the like. The effect of non-uniformity is considered to become more serious according as the width of the junction plane 5c (the vertical width in FIG. 6 and the like, substantially corresponding to the thickness of the bonding layer formed by the adhesive) becomes larger.

To reduce the extent of this influence, therefore, it is recommendable to make the main screen 5 and the transmissive diffusion screen 6 (or 7) more distant from each other in the luminous flux passing direction, in response to the width of the junction plane 5c. However, an excessively large distance between them blurs the formed image itself. An optimum distance is therefore determined by taking account of the size of the image projected from the projector and the available resolution.

It is also possible to select a transmissive diffusion screen having a high degree of light diffusion or a relatively low degree of diffusion. By using a transmissive diffusion screen of a high degree of diffusion, therefore, it is possible to alleviate the effect of the junction plane 5c while retaining image fineness by reducing the distance between the main screen and the transmissive diffusion screen in the luminous flux passing direction. Use of a transmissive diffusion screen of a low degree of diffusion, in contrast, it is necessary to provide a relatively long distance between the main screen and the transmissive diffusion screen in the luminous flux passing direction while considering an image blur.

An example of bonding of the lenticular sheets will now be described with reference to FIGS. 7 to 12.

FIG. 7 illustrates bonding of lenticular lens sheets 5F and 5G which are two screen sheet members at the center so that the right and the left form substantial symmetricity. The main screen 5 based on such bonding is suitable for projection of a usual single image from the projector 2, and in addition, suitable for a case, for example, where a so-called multi-screen is often projected.

A preferred example of an arrangement of the junction plane 5c in the screen will be described with reference to FIGS. 8 and 9.

In a system using a single projector 2, in general, light enters substantially vertically to the screen for a rear projection type projector 1 near the center of the screen, and diagonally at an angle in portions other than the center portion.

The junction plane 5c is formed as a bonding layer 5f as shown in FIG. 8 by using an adhesive as described above. When light comes in vertically (arrow A direction) the bonding layer 5f, the light passes only through the bonding layer 5f and is emitted. As a result, the degree of diffusion of the light by the junction plane 5c is relatively low.

The light entering diagonally at an angle larger than a certain value to the junction plane 5c passes first through the lenticular layer of the lenticular lens sheet 5G, then the bonding layer 5f, and finally the lenticular layer of the lenticular lens sheet 5F in this sequence (see the arrow B). The degree of diffusion of the light by the junction plane 5c is therefore higher than in the vertical incidence represented by the arrow A. When the light enters diagonally to the junction plane 5c, therefore, seams between the lenticular lens sheets become more distinct for the observer.

In the example shown in FIG. 9, contrivances are made in the arrangement, paying attention to the fact that vertical incidence of light to the bonding layer 5f leads to a slighter effect of the junction plane on the image than the diagonal incidence.

As shown in FIG. 9, the screen 1 for a rear projection type projector is arranged vertically to the optical axis 0 of the luminous flux projected from the projector 2, and the junction plane 5c is arranged at a position where the junction plane 5c substantially crosses the optical axis 0.

In the example shown in FIG. 9, in which projection is conducted from a single projector 2, the configuration is such that the junction plane 5c is positioned near the center of the main surface (see FIG. 7).

Influence on the image can be inhibited to a minimum by arranging the junction plane 5c at a position where it crosses the optical axis 0. The influence can be inhibited to an extent not causing a practical trouble also by arranging the same at W within a range of, for example, ±5° with the optical axis as a center.

It is recommendable to adopt an optimum value of angle within an allowable range in response to the design since it is susceptible to the effect of the thickness of the lenticular lens sheet.

When the image is projected from a plurality of projectors, it is preferable that the junction plane 5c is positioned on the optical axis of any one of the projectors 2.

In FIG. 10, a lenticular lens sheet 5H to keep the maximum width of the sheet formed by the manufacturing line is arranged at the center. The balance width necessary for the right and left sides are cut appropriately from a sheet formed on the manufacturing line as lenticular lens sheets 5I and 5J which are then bonded to the lenticular sheet 5H at the right and left side portions with the center portion in between. As a result, the junction plane is located at a position off the center portion of the main surface.

While the lenticular lens sheets are located along the troughs of the lenses in the examples shown in FIGS. 7 and 10, the junction plane is provided in a direction perpendicular to the lenticular direction in the example shown in FIG. 11.

In some manufacturing methods of lenticular lens sheets, the width in the lenticular direction is regulated, and a length in a direction perpendicular to the lenticular direction may be relatively freely selected. An example of bonding suitable for such cases is shown in FIG. 11.

In this example, a lenticular lens sheet 5L is formed so as to have the largest possible width, and the balance of the necessary width is provided by cutting a lenticular lens sheet 5K.

FIG. 12 illustrates an example in which a lenticular lens sheet is formed by cutting so as to give a diagonal lenticular direction relative to a rectangular main sheet 5.

In this example, a lenticular lens sheet 5M is cut from a sheet LS1 having a maximum width available from a manufacturing line so as to achieve a lenticular direction at substantially 45° diagonally to the left downward, and a balance lenticular lens sheet 5N is cut from a sheet LS2. A main sheet 5 is formed by bonding these lenticular lens sheets.

If a diagonal lenticular direction is achieved, it is possible to form a screen in which a moire is not distinct while increasing the scale of the apparatus.

FIG. 13 illustrates a holographic screen 11 having different degrees of diffusion in the vertical and horizontal directions.

The holographic screen 11 is formed so that, for example, the degree of diffusion is higher (diffusion-passing luminous flux more widely) for the diffusion distribution 11h in the horizontal direction (H-direction) than for the diffusion distribution 11v in the vertical direction (V-direction).

When using such a holographic screen 11 as a transmissive diffusion screen 6 to the main screen 5 as shown in FIGS. 2A and 2B, the degree of diffusion is higher in a direction perpendicular to the junction plane 5c than in a direction in parallel with the junction plane 5c from among the directions within the main surface thereof. It is therefore possible to accomplish diffusion more efficiently and reduce the optical effect of the junction plane 5c while maintaining the finess of the image.

On the other hand, the holographic screen 11 can be used also as a main screen. When it is difficult to manufacture a holographic screen 11 as a single sheet-shaped member in this case, a main screen would be formed by bonding a plurality of holographic screen sheets so that the degree of diffusion is higher in a direction perpendicular to the junction plane, the luminous fluxes emitted from the junction plane would be diffused more before the latter-stage transmissive diffusion screen is reached. It is therefore possible to reduce the optical effect of the junction plane while maintaining the finess of the image by arranging the transmissive diffusion screen closer thereto.

FIG. 14 illustrates an optimum position of the junction plane 12c in a type in which the lenticular lens sheet 12 has black stripes 12e.

This lenticular lens sheet 12 has a configuration in which long and slender black stripes 12e are formed in the lenticular direction on a side of each of a plurality of long and slender substantially cylindrical or substantially semi-cylindrical lenses 12d in the lenticular direction, thereby reducing a decrease in contrast caused by reflection of external light. A junction plane 12c between lenticular lens sheets is arranged at a position dividing a black stripe 12e, whereby the junction plane 12c exerts almost no optical effect.

FIG. 15 illustrates an example of the screen for a rear projection type projector, composed by laminating two lenticular lens sheets and a transmissive diffusion screen.

This screen for a rear projection type projector further comprises a second main screen 8 arranged on the optical path between the main screen 5 and the transmissive diffusion screen 6 as shown in FIGS. 2A and 2B.

The second main screen 8 is arranged so that the lenticular direction is perpendicular to the main screen 5, and the longer side of the rectangle is in the lenticular direction. It is therefore possible to manufacture the same as a single member without bonding.

By arranging the main screen 5 formed by bonding the lenticular lens sheet 5A and the lenticular lens sheet 5B at the junction plane 5c on the side closer to the projector 2, the main screen 5 and the transmissive diffusion screen 6 become more distinct from each other, thus providing more remarkable diffusion effect. This gives an additional diffusion effect brought about by the second main screen 8, permitting sufficient reduction of the optical influence of the junction plane 5c.

FIG. 16 illustrates an example in which, in the configuration shown in FIG. 15, the latter-stage lenticular lens sheet serves also as a transmissive diffusion screen.

The screen for a rear projection type projector shown in FIG. 16 is formed by omitting the transmissive diffusion screen 6 from the configuration shown in FIG. 15, and the second main screen 8 plays the function of the transmissive diffusion screen.

More specifically, as described above, the lenticular lens sheet itself has a function of diffusing the light. Even in this configuration, therefore, it is possible to reduce the optical effect of the junction plane 5c and thus to form a screen in which streaks are hard to be found.

The lenticular lens screen and the holographic screen have been presented above as examples of the main screen formed by bonding a plurality of screen sheet members. The bonded main screen in the invention is not limited to the above, but a Fresnel screen or a bead screen may be used.

According to the embodiment of the invention, which provides a large-area main screen formed by bonding a plurality of screen sheet members, the necessity is eliminated to use a new manufacturing line for integrally forming large-area screen sheet members, and it is possible to manufacture a screen for a rear projection type projector of a desired size while reducing the cost.

Furthermore, because a transmissive diffusion screen is arranged on the observer side of the main screen comprising a plurality of bonded screen sheet members, the junction plane exerts almost no effect on the observed image, thus enabling enjoyment of a high-definition large screen.

Since the junction plane is arranged at a position where it substantially crosses the optical axis at the center of the main surface of the main screen, it is possible to inhibit scattering of light caused by the junction plane, and when observing the image, avoid the adverse effect exerted by the junction plane as far as possible.

In addition, by using a holographic screen diffusing luminous fluxes passing through in a direction perpendicular to the junction plane more widely, thus effectively reducing the optical effect of the junction plane.

Having described the preferred-embodiments of the invention referring to the accompanying drawings, it is to be understood that the invention is not limited to those precise embodiments and that various changes and modifications thereof could be effected by one skilled in the art without departing from the spirit or scope of the invention as defined in the appended claims.

What is claimed is:

1. A screen for a rear projection type projector, comprising:
    a lenticular lens screen formed from at least two lenticular lens sheet members having respective edges which are bonded together at a junction plane; and
    a transmissive diffusion screen that diffuses luminous fluxes which have passed through the lenticular lens screen to expand a viewing angle;
    wherein said transmissive diffusion screen is arranged on an observer side of the lenticular lens screen; and
    wherein the junction plane is positioned along an off center portion of a main surface of the main screen.

2. A screen for a rear projection type projector according to claim 1, wherein said transmissive diffusion screen is formed by coating one of a diffusion agent and a tinting agent on a transparent layer comprising an acrylic plate, thereby forming a thin image forming layer in a luminous flux passing direction, and said image forming layer is arranged so as to face the lenticular lens screen.

3. A screen for a rear projection type projector according to claim 1, wherein said transmissive diffusion screen is a kneaded type transmissive diffusion screen, and said kneaded type transmissive diffusion screen is formed by kneading one of a diffusion agent and a tinting agent into a substrate material.

4. A screen for a rear projection type projector, comprising:
    a holographic screen formed from at least two holographic screen sheet members having respective edges which are bonded together at a junction plane; and
    a transmissive diffusion screen that diffuses luminous fluxes which have passed through the holographic screen to expand a viewing angle;
    wherein said transmissive diffusion screen is arranged on an observer side of the holographic screen; and
    wherein the junction plane is positioned along an off center portion of a main surface of the main screen.

5. A screen for a rear projection type projector according to claim 4, wherein said transmissive diffusion screen is formed by coating one of a diffusion agent and a tinting agent on a transparent layer comprising an acrylic plate, thereby forming a thin image forming layer in a luminous flux passing direction, and said image forming layer is arranged so as to face the holographic screen.

6. A screen for a rear projection type projector according to claim 4, wherein said transmissive diffusion screen is a kneaded type transmissive diffusion screen, and said kneaded type transmissive diffusion screen is formed by kneading one of a diffusion agent and a tinting agent into a substrate material.

* * * * *